United States Patent
Shah et al.

(10) Patent No.: US 11,412,040 B1
(45) Date of Patent: Aug. 9, 2022

(54) USING MAINTENANCE MODE TO UPGRADE A DISTRIBUTED SYSTEM

(71) Applicant: VMware, Inc., Palo Alto, CA (US)

(72) Inventors: Alkesh Shah, Palo Alto, CA (US); Ramses V. Morales, Palo Alto, CA (US); Leonid Livshin, Boston, MA (US); Austin Kramer, Palo Alto, CA (US); Nitin Nagaraja, Palo Alto, CA (US); Brian Masao Oki, Palo Alto, CA (US); Sunil Vajir, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/384,295

(22) Filed: Jul. 23, 2021

(51) Int. Cl.
*G06F 15/173* (2006.01)
*H04L 67/1095* (2022.01)
*H04L 41/5025* (2022.01)
*H04L 67/148* (2022.01)
*H04L 67/561* (2022.01)

(52) U.S. Cl.
CPC ...... *H04L 67/1095* (2013.01); *H04L 41/5025* (2013.01); *H04L 67/148* (2013.01); *H04L 67/561* (2022.05)

(58) Field of Classification Search
CPC ............. H04L 67/1095; H04L 41/5025; H04L 67/148; H04L 67/2804

USPC ....................................................... 709/224
See application file for complete search history.

(56) References Cited

U.S. PATENT DOCUMENTS

| | | | |
|---|---|---|---|
| 9,148,465 B2 | 9/2015 | Gambardella et al. | |
| 9,904,533 B2* | 2/2018 | Kuchibhotla | G06F 8/71 |
| 10,042,628 B2 | 8/2018 | Olmstedthompson | |
| 10,142,204 B2 | 11/2018 | Nickolov et al. | |
| 2006/0048017 A1 | 3/2006 | Anerousis et al. | |
| 2006/0184930 A1 | 8/2006 | Fuente et al. | |
| 2011/0099266 A1 | 4/2011 | Calder et al. | |
| 2011/0107135 A1 | 5/2011 | Andrews et al. | |
| 2017/0235563 A1* | 8/2017 | Bafna | G06F 9/4406 718/1 |
| 2019/0171435 A1* | 6/2019 | Pande | H04L 41/082 |
| 2020/0081704 A1* | 3/2020 | Bafna | G06F 16/1727 |
| 2021/0382705 A1* | 12/2021 | Kulaga | G06F 9/4881 |

* cited by examiner

*Primary Examiner* — Karen C Tang

(57) ABSTRACT

The present disclosure relates to using maintenance mode to upgrade a distributed system. One method includes determining that a first host of a cluster of a software-defined datacenter (SDDC) is to be upgraded as a part of a rolling upgrade of the hosts of the cluster, wherein the first host is executing a process instance of a cluster store, demoting the process instance to a proxy, creating a replica of the process instance using a different proxy on a second host of the cluster, instructing the first host to enter a maintenance mode, upgrading the first host, and instructing the first host to leave the maintenance mode.

20 Claims, 3 Drawing Sheets

US 11,412,040 B1

USING MAINTENANCE MODE TO UPGRADE A DISTRIBUTED SYSTEM

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may utilize data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a distributed system, such as a software-defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

Distributed systems may undergo upgrades to their software. In contemporary data centers, availability, automation, and data durability during upgrades are highly valued.

DETAILED DESCRIPTION

Figure 1:
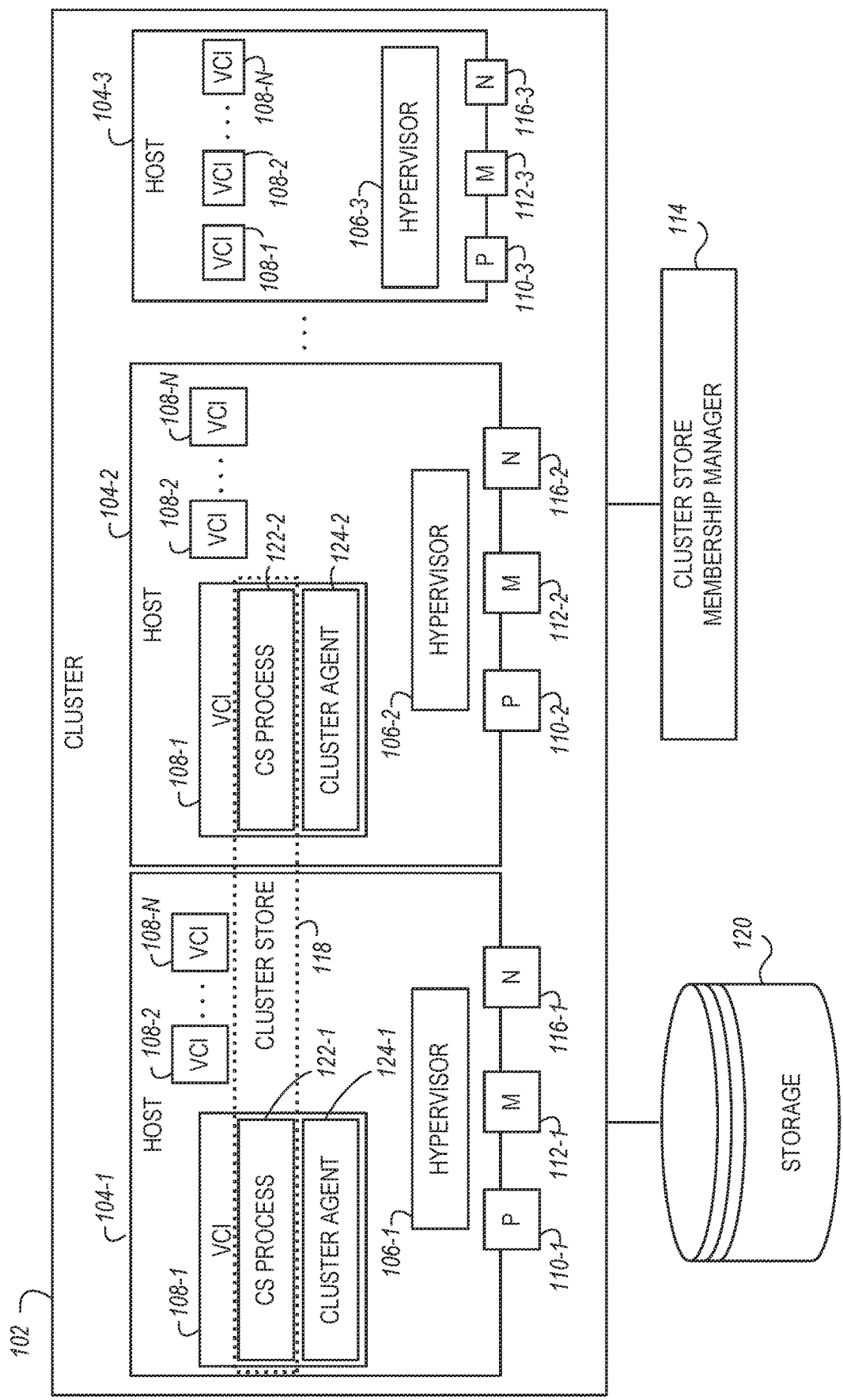
FIG. 1 is a diagram of a cluster and a system for using maintenance mode to upgrade a distributed system according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes. Where a process, for instance, is discussed herein as being executed by a VCI, it is to be understood that such discussion is made for purposes of illustration and embodiments of the present disclosure are not so limited.

Distributed systems, such as software-defined data centers (SDDCs), may undergo upgrades to their software. In contemporary data centers, availability, automation, and data durability during upgrades is desired. In distributed systems a rolling upgrade process can be implemented to reduce downtime and service disruption. However, SDDCs typically contain open source components used to instantiate a single process, which makes supporting different software versions difficult. Additionally, it may be difficult to operate the system such that it is available enough to achieve consensus during a rolling upgrade.

Embodiments of the present disclosure include a cluster store that provides consistency while an upgrade is ongoing. A cluster store, as referred to herein, is a distributed system that allows reading and writing data in a consistent manner. As described further below, a SDDC can include a number of clusters. A cluster is a group of hosts. A cluster manages the resources of all hosts within it. A cluster store in accordance with embodiments of the present disclosure is a distributed system provided by a cluster and can handle metadata for the cluster. Such metadata can include, for instance, membership information of the cluster (e.g., which hosts comprise the cluster). A cluster store includes processes. Each host of a cluster can contain (e.g., execute) one instance of a process (sometimes referred to herein as a "process instance") of the cluster store. Cluster store process instances can answer read requests and/or write requests. In some embodiments, less than all hosts of a cluster can contain a process instance of the cluster store. The set of cluster store process instances may be referred to as "cluster store membership" and can range from one host to the total number of hosts in a data center.

A rolling upgrade includes upgrading the version of each process instance of the cluster store and each host of the cluster. Stated differently, a rolling upgrade can include updating the bits of each instance of a cluster store's processes from version "V-1" to version "V" and updating the image (including the binary of the cluster store) of the hosts comprising the cluster. In some embodiments, for instance, a particular process instance (or a particular host) can be shut down, upgraded, and then restarted. This process can continue with each process instance and each host one-by-one, until all process instances and hosts are upgraded.

A cluster store can be said to be "available" when a cluster store client (e.g., a VCI) can perform read and write operations. A cluster store can be said to be available when it has quorum to achieve distributed consensus. As known to those of skill in the art, quorum refers to the number (e.g., minimum number) of votes that a distributed transaction has to obtain in order to be allowed to perform an operation in a distributed system. Also, a cluster store can be said to be available when a fault tolerance threshold has not been exceeded, and unavailable when the fault tolerance threshold has been exceeded. In an example cluster store having three process instances, the fault tolerance threshold may be one (e.g., wherein two instances are needed for availability).

Embodiments of the present disclosure can reduce the loss of availability of the cluster store during a rolling upgrade. Stated differently, embodiments herein can implement a "best-effort" mechanism to help the cluster store remain operational and available. This "best effort" is made under the general guideline that upgrading the hosts in a cluster takes precedence over the availability of the cluster store.

For instance, in some embodiments, a host to be upgraded can enter maintenance mode before it is upgraded. If that host is running an instance of the cluster store, then it can be stopped and the instance removed, whereupon a new instance (e.g., a replica) can be created in a different host. Accordingly, if there are any hosts that can run the process instance, availability can be maintained during an upgrade. Maintenance mode, as referred to herein, is a state of a host where all processes running on that host are stopped or migrated (e.g., to a different host). Some embodiments, discussed further below, include a "partial maintenance mode," wherein a particular subset of processes running on that host are stopped or migrated.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Analogous elements within a Figure may be referenced with a hyphen and extra numeral or letter. Such analogous elements may be generally referenced without the hyphen and extra numeral or letter. For example, elements 108-1, 108-2, and 108-N in FIG. 1 may be collectively referenced as 108. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a diagram of a cluster and a system for using maintenance mode to upgrade a distributed system according to one or more embodiments of the present disclosure. The system can include a cluster 102 in communication with a cluster store membership manager (CSMM) 114 and storage 120. Though a single cluster is illustrated in FIG. 1 for purposes of illustration, embodiments of the present disclosure are not limited to a particular number of clusters. The cluster 102 can include a first host 104-1 with processing resources 110-1 (e.g., a number of processors), memory resources 112-1, and/or a network interface 116-1. The cluster 102 can include a second host 104-2 with processing resources 110-2, memory resources 112-2, and/or a network interface 116-2. The cluster 102 can include a third host 104-3 with processing resources 110-3, memory resources 112-3, and/or a network interface 116-3. Though three hosts are shown in FIG. 1 for purposes of illustration, embodiments of the present disclosure are not limited to a particular number of hosts. For purposes of clarity, the first host 104-1, the second host 104-2, and/or the third host 104-3 (and/or additional hosts not illustrated in FIG. 1) may be generally referred to as "host 104." Similarly, reference is made to "hypervisor 106," "VCI 108," "processing resources 110," memory resources 112," "network interface 116," etc., and such usage is not to be taken in a limiting sense.

The host 104 can be included in a software-defined data center. A software-defined data center can extend virtualization concepts such as abstraction, pooling, and automation to data center resources and services to provide information technology as a service (ITaaS). In a software-defined data center, infrastructure, such as networking, processing, and security, can be virtualized and delivered as a service. A software-defined data center can include software-defined networking and/or software-defined storage. In some embodiments, components of a software-defined data center can be provisioned, operated, and/or managed through an application programming interface (API).

The host 104 can incorporate a hypervisor 106 that can execute a number of VCIs 108-1, 108-2, . . . , 108-N (referred to generally herein as "VCIs 108"). The VCIs 108 can be provisioned with processing resources 110 and/or memory resources 112 and can communicate via the network interface 116. The processing resources 110 and the memory resources 112 provisioned to the VCIs 108 can be local and/or remote to the host 104. For example, in a software-defined data center, the VCIs 108 can be provisioned with resources that are generally available to the software-defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the CSMM 114. In some embodiments, the CSMM 114 can be deployed on a server, such as a web server. In some embodiments, the CSMM can be a process in a host. In some embodiments, the CSMM can be a distributed system running in the hosts 104.

The CSMM 114 can include computing resources (e.g., processing resources and/or memory resources in the form of hardware, circuitry, and/or logic, etc.) to perform various operations to use maintenance mode to upgrade a distributed system. In some embodiments, the CSMM 114 can be part of a cluster controller (e.g., a vSAN cluster manager). In some embodiments, the local disks of the hosts 104 can act as pooled storage for the cluster 102 (e.g., storage 120) that can store data corresponding to the VCIs 108-1, . . . 108-N.

The cluster 102 includes a cluster store 118. The cluster store 118 is a distributed system that allows reading and writing data in a consistent manner. The cluster 118 manages the resources of the hosts 104. As previously discussed, the cluster store 118 includes processes. As shown in FIG. 1, the cluster store 118 can be considered as a set of cluster store process instances 122. For instance, as shown in the example illustrated in FIG. 1, the VCI 108-1 can execute a cluster store process instance 122-1, and the VCI 108-2 can execute a cluster store process instance 122-2. The cluster store process instance 122-1 and the the cluster store process instance 122-2 can work together to provide the cluster store 118. It is noted that while the process instances 122 are shown as being executed by VCIs 108, embodiments herein are not so limited.

Embodiments here can implement a replicated state machine and each process instance 122 can include a replica of that state machine, thereby allowing replication of the data of the cluster store 118. A "replica" of a process instance refers to the data stored by a single cluster store process instance 122. The cluster store process instances 122 can answer read requests and/or write requests. In some embodiments, less than all hosts 104 of the cluster 102 contain a process instance 122 of the cluster store 118. The set of cluster store process instances 122 may be referred to as "cluster store membership" and can range from one host to the total number of hosts in a data center. For instance, as shown in the example illustrated in FIG. 1, the membership of the cluster store 118 includes the host 104-1 and the host 104-2, as the host 104-3 is not shown as executing a cluster store process instance. Hosts that do not contain a process instance (e.g., host 104-3) can contain a proxy. A proxy, as referred to herein, is a node of the distributed system that can, in some instances, become a process instance (e.g., a replica) through a process of replica transfer. In some embodiments, a replica can be demoted (e.g., evacuated) to a proxy, as described further below.

The host 104-1 and the host 104-2 each include a cluster agent 124. The cluster agent 124 interacts with the cluster store 118 and controls the configuration and execution of each cluster store process instance 122. Additionally, the cluster agent 124 can be an intermediary between the CSMM 114 and the cluster store 118. In some embodiments, the cluster store 118 and the cluster agent 124 are proprietary, while at least a portion of the software-defined datacenter is open source.

In order to maintain a fault tolerance threshold for the cluster store 118, embodiments herein can evacuate the replica that is requested to be put in maintenance mode and move it to a host that is not in maintenance mode. Evacuation, as referred to herein, is the demotion of a replica to a proxy. Moving, as referred to herein, is the creation of a replica from another proxy member (if available). The CSMM 114 can manage the lifecycle of the cluster store 118 and define which nodes are replica nodes and which nodes are proxy nodes. For instance, the CSMM 114 can determine a suitable host for moving the replica and track whether a proxy is capable of becoming a replica. In some instances, there may not be a proxy available (or capable) to move the replica. For example, some clusters may have no available hosts or only a single host. In such instances, the fault tolerance threshold may be decremented when the host enters maintenance mode. Falling below the fault tolerance threshold is considered acceptable in some instances because maintaining the fault tolerance threshold is, as discussed above, a best effort.

In accordance with the present disclosure, one replica transfer may be allowed to be in progress at a time. Stated differently, replica transfer can be considered a serial operation. However, once a replica is put in maintenance mode and is being upgraded, another replica or a proxy can be put in maintenance mode, too. Stated differently, multiple hosts can be put into maintenance mode for the purpose of upgrading the hosts 104 of the data center. Maintaining availability depends on the membership of the cluster store 118 and the size of the cluster 102. In an example, a 3-host cluster with a fault tolerance threshold of 1 implies that all hosts are running as replica and there are no proxy nodes to transfer the replica. As a result, only one replica can enter maintenance mode to be upgraded. In cases like this example, additional replicas can, if desired, be placed in maintenance mode by force (e.g., user input) and the cluster store 118 may incur downtime until the upgrade is complete and maintenance mode is left.

In a scenario where a proxy is available, the CSMM 114 can start a replica migration before instructing the host to be upgraded to enter maintenance mode. Once the replica migration is complete, the host can be placed in maintenance mode and upgraded. Following the upgrade, the CSMM 114 can instruct the host to leave maintenance mode. Fully operational again, the host can now become the destination of another replica migration as the rolling upgrade continues.

In a scenario where a proxy is not available and where the fault tolerance threshold is greater than zero, the CSMM 114 can instruct the replica to demote itself to a proxy. Accordingly, the fault tolerance threshold is decremented (e.g., by one). The host can then enter maintenance mode and be upgraded. Upon completion of the upgrade, the CSMM 114 can instruct the host to leave maintenance mode and to instantiate a replica. Once the replica is running on the upgraded host, the fault tolerance threshold is incremented (e.g., by one).

In a scenario where a cluster contains two nodes, the fault tolerance threshold is zero, and the cluster store 118 is running only one instance, one proxy is available to move the replica. That is, the CSMM 114 can start a replica migration before instructing the host to be upgraded to enter maintenance mode. Once the replica migration is complete, the host can be placed in maintenance mode and upgraded. Following the upgrade, the CSMM 114 can instruct the host to leave maintenance mode.

In some scenarios, a SDDC contains only a single host. The CSMM 114 can instruct the cluster store 118 to demote itself to a proxy. Then, the CSMM 114 can instruct the host to enter maintenance mode to be upgraded. Once the upgrade finishes, the CSMM 114 can instruct the host to leave maintenance mode and the replica can be re-enabled.

In some embodiments, a partial maintenance mode is entered. As discussed above, partial maintenance mode causes a particular subset of processes running on a host to be stopped or migrated rather than all processes. In some embodiments, even if a replica is not included in the subset that is to be stopped or migrated, it is evacuated nonetheless if it has a dependency on a process that is. For instance, some embodiments include determining that a process instance has a dependency on a process that is included in the particular subset of processes running on the host that is to be stopped or migrated according to the partial maintenance mode. If such a dependency is determined, the process can be demoted, and a replica created in a manner analogous to that described above.

Figure 2:
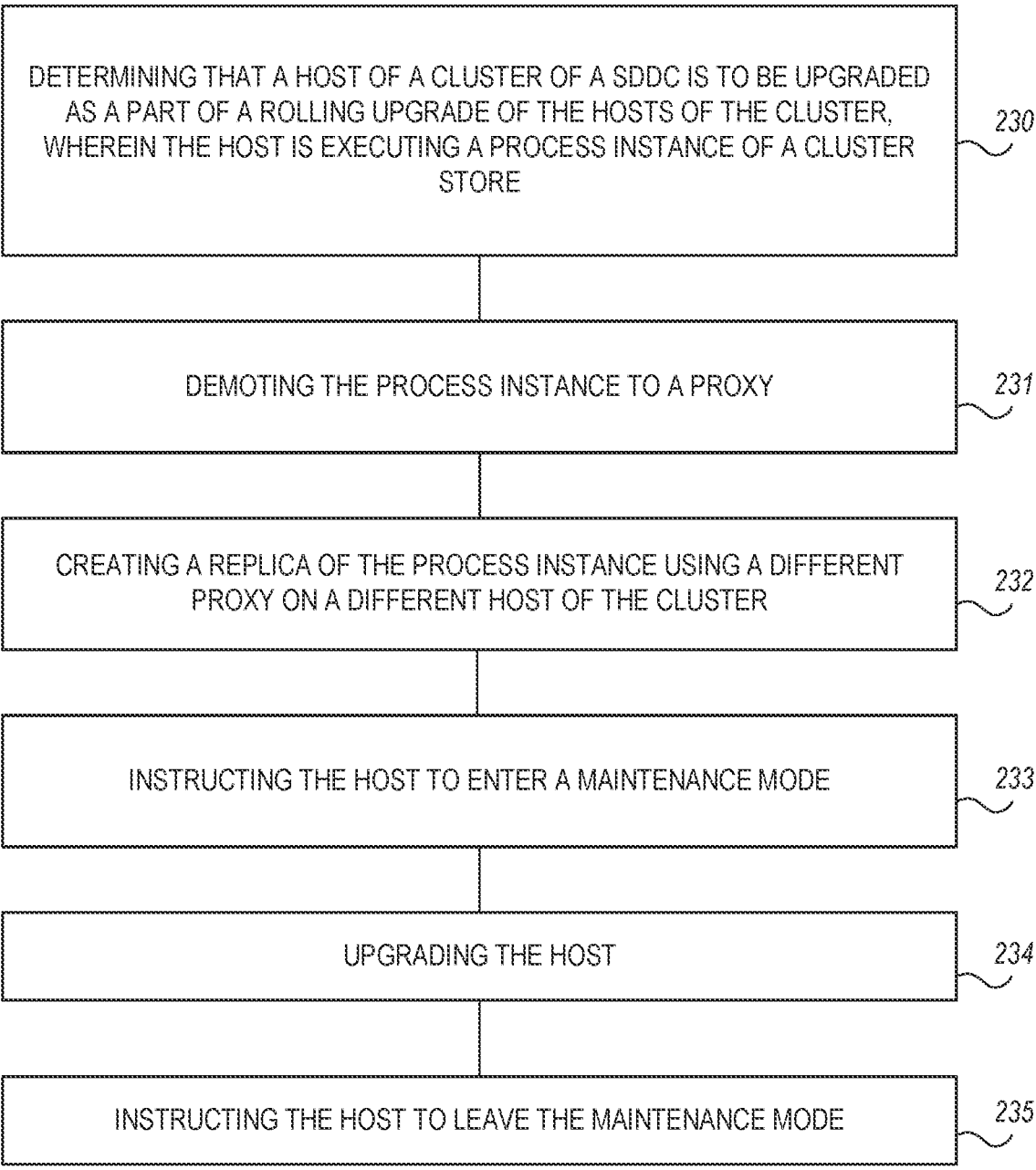
FIG. 2 illustrates a method for using maintenance mode to upgrade a distributed system according to one or more embodiments of the present disclosure.

FIG. 2 illustrates a method for using maintenance mode to upgrade a distributed system according to one or more embodiments of the present disclosure. At 230, the method includes determining that a first host of a cluster of a SDDC is to be upgraded as a part of a rolling upgrade of the hosts of the cluster, wherein the first host is executing a process instance of a cluster store. At 231, the method includes demoting the process instance to a proxy. At 232, the method includes creating a replica of the process instance using a different proxy on a second host of the cluster. At 233, the method includes instructing the first host to enter a maintenance mode. At 234, the method includes upgrading the first host. At 235, the method includes instructing the first host to leave the maintenance mode.

In some embodiments, the method includes creating another replica of the process instance using the proxy on the first host subsequent to instructing the first host to leave the maintenance mode responsive to a determination that a third host is to be upgraded as part of the rolling upgrade. In some embodiments, the method includes creating the replica of the process instance using the different proxy on the second host responsive to a determination that the second host is not executing another process instance of the cluster store.

Figure 3:
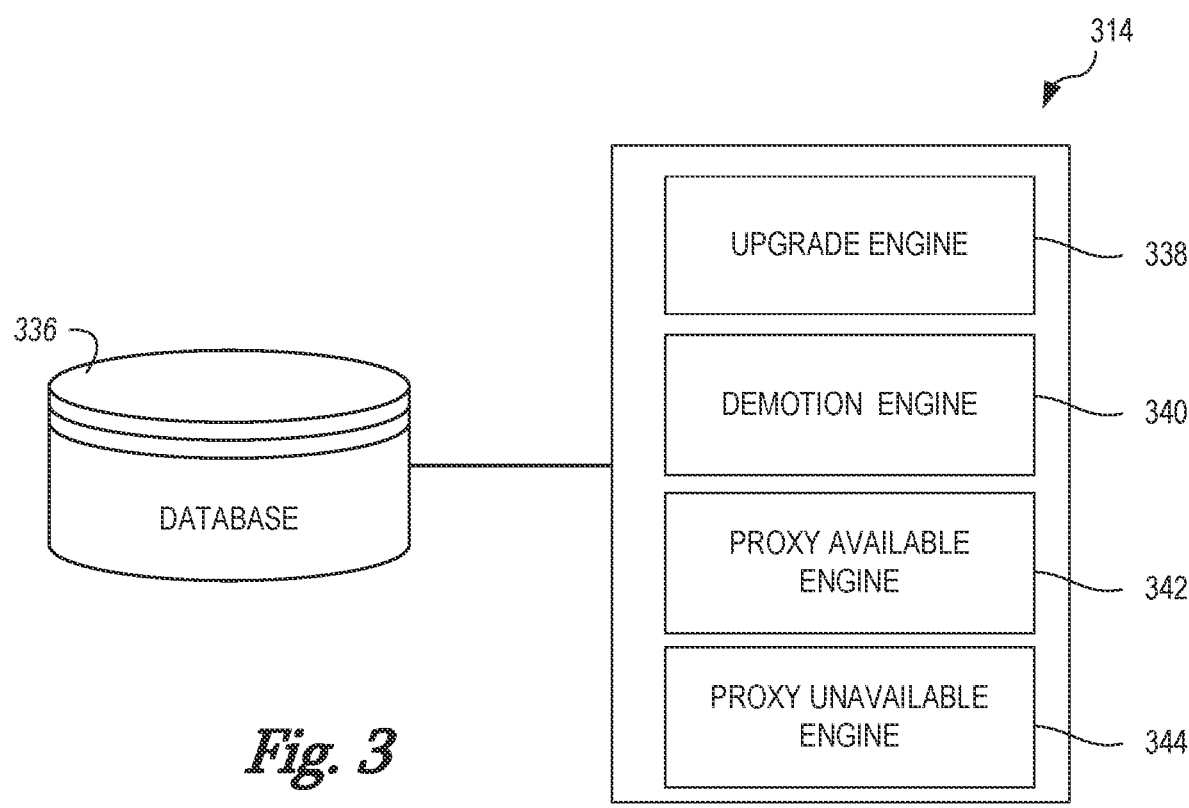
FIG. 3 is a diagram of a system for using maintenance mode to upgrade a distributed system according to one or more embodiments of the present disclosure.

FIG. 3 is a diagram of a system 314 for using maintenance mode to upgrade a distributed system according to one or more embodiments of the present disclosure. The system 314 can include a database 336 and/or a number of engines, for example upgrade engine 338, demotion engine 340, proxy available engine 342 and/or proxy unavailable engine 344, and can be in communication with the database 336 via a communication link. The system 314 can include additional or fewer engines than illustrated to perform the various functions described herein. The system can represent program instructions and/or hardware of a machine (e.g., machine 446 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the upgrade engine 338 can include a combination of hardware and program instructions that is configured to determine that a first host of a cluster of a SDDC is to be upgraded as a part of a rolling upgrade of the hosts of the cluster, wherein the first host is executing a process instance of a cluster store. In some embodiments, the demotion engine 340 can include a combination of hardware and program instructions that is configured to demote the process instance to a proxy. In some embodiments, the proxy available engine 342 can include a combination of hardware and program instructions that is configured to perform a number of functions responsive to a determination that a different proxy on a second host of the cluster is capable of being used to create a replica of the process instance. For instance, the proxy available engine can be configured to create the replica of the process instance using the different proxy on the second host, instruct the first host to enter a maintenance mode, upgrade the first host, and instruct the first host to leave the maintenance mode. In some embodiments, the proxy unavailable engine 344 can include a combination of hardware and program instructions that is configured to perform a number of functions responsive to a determination that there is not a proxy in the cluster that is capable of being used to create the replica of the process instance. For instance, the proxy unavailable engine can be configured to decrement a fault tolerance threshold associated with the cluster, instruct the first host to enter the maintenance mode, upgrade the first host, instruct the first host to leave the maintenance mode and instantiate another replica, and increment the fault tolerance threshold associated with the cluster responsive to a determination that the other replica is being executed.

Figure 4:
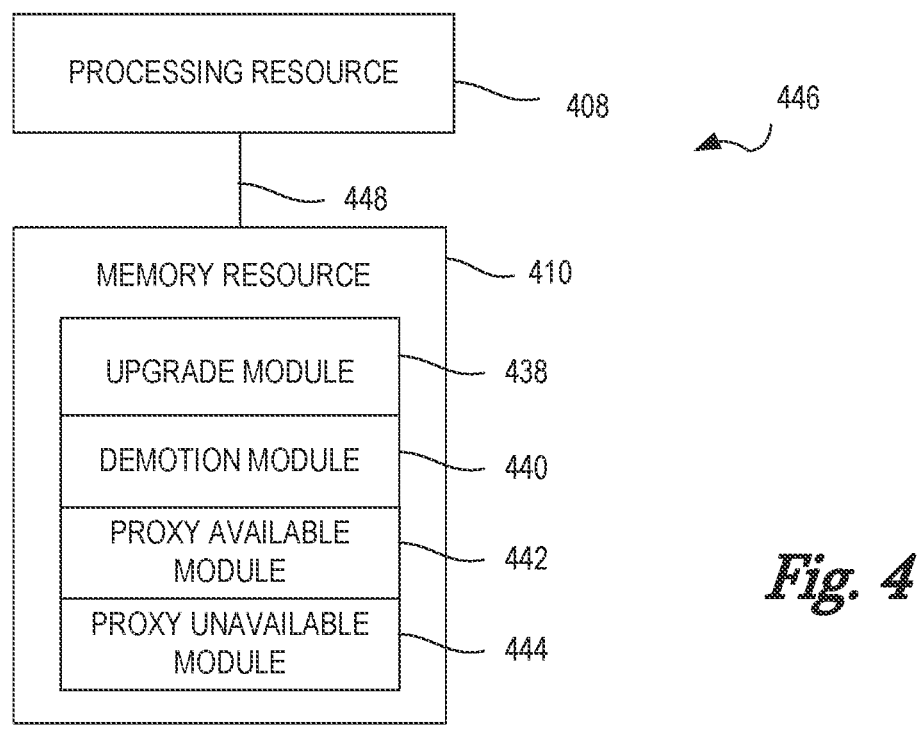
FIG. 4 is a diagram of a machine for using maintenance mode to upgrade a distributed system according to one or more embodiments of the present disclosure.

FIG. 4 is a diagram of a machine for using maintenance mode to upgrade a distributed system according to one or more embodiments of the present disclosure. The machine 446 can utilize software, hardware, firmware, and/or logic to perform a number of functions. The machine 446 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 446 (e.g., the machine 446 can include internal memory resources and have access to external memory resources). In some embodiments, the machine 446 can be a VCI. The program instructions (e.g., machine-readable instructions (MRI)) can include instructions stored on the MRM to implement a particular function (e.g., an action such as taking a remedial action, as described herein). The set of MRI can be executable by one or more of the processing resources 408. The memory resources 410 can be coupled to the machine 446 in a wired and/or wireless manner. For example, the memory resources 410 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 408 can be coupled to the memory resources 410 via a communication path 448. The communication path 448 can be local or remote to the machine 446. Examples of a local communication path 448 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 448 can be such that the memory resources 410 are remote from the processing resources 408, such as in a network connection between the memory resources 410 and the processing resources 408. That is, the communication path 448 can be a network connection. Examples of such a network connection can include a local area network (LAN), wide area network (WAN), personal area network (PAN), and the Internet, among others.

As shown in FIG. 4, the MM stored in the memory resources 410 can be segmented into a number of modules 438, 440, 442, 444 that when executed by the processing resources 408 can perform a number of functions. As used herein a module includes a set of instructions included to perform a particular task or action. The number of modules 438, 440, 442, 444 can be sub-modules of other modules. For example, the demotion module 440 can be a sub-module of the upgrade module 438 and/or can be contained within a single module. Furthermore, the number of modules 438, 440, 442, 444 can comprise individual modules separate and distinct from one another. Examples are not limited to the specific modules 438, 440, 442, 444 illustrated in FIG. 4.

Each of the number of modules 438, 440, 442, 444 can include program instructions and/or a combination of hardware and program instructions that, when executed by a processing resource 408, can function as a corresponding engine as described with respect to FIG. 3. For example, the upgrade module 438 can include program instructions and/or a combination of hardware and program instructions that, when executed by a processing resource 408, can function as the upgrade engine 338, though embodiments of the present disclosure are not so limited.

The machine 446 can include an upgrade module 438, which can include instructions to determine that a first host of a cluster of a SDDC is to be upgraded as a part of a rolling upgrade of the hosts of the cluster, wherein the first host is executing a process instance of a cluster store. The machine 446 can include a demotion module 440, which can include instructions to demote the process instance to a proxy. The machine 446 can include a proxy available module 442, which can include instructions to, responsive to a determination that a different proxy on a second host of the cluster is capable of being used to create a replica of the process instance: create the replica of the process instance using the different proxy on the second host, instruct the first host to enter a maintenance mode, upgrade the first host, and instruct the first host to leave the maintenance mode. The machine 446 can include a proxy unavailable module 444, which can include instructions to, responsive to a determination that there is not a proxy in the cluster that is capable of being used to create the replica of the process instance: instruct the first host to enter the maintenance mode, upgrade the first host, and instruct the first host to leave the maintenance mode. The determination that there is not a proxy in the cluster that is capable of being used to create the replica of the process instance can include a determination of a lack of proxy on the second host and/or a determination that the cluster includes only one host.

In some embodiments, the machine 446 includes instructions to decrement a fault tolerance threshold associated with the cluster responsive to the determination that there is not the proxy in the cluster that is capable of being used to create the replica of the process instance. In some embodiments, the machine 446 includes instructions to, responsive to the determination that there is not the proxy in the cluster that is capable of being used to create the replica of the process instance, instruct the first host to leave the maintenance mode and instantiate another replica. In some embodiments, the machine 446 includes instructions to increment the fault tolerance threshold associated with the cluster responsive to a determination that the other replica is being executed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining that a first host of a cluster of a software-defined datacenter (SDDC) is to be upgraded as a part of a rolling upgrade of the hosts of the cluster, wherein the first host is executing a process instance of a cluster store;
   demoting the process instance to a proxy;
   creating a replica of the process instance using a different proxy on a second host of the cluster;
   instructing the first host to enter a maintenance mode;
   upgrading the first host; and
   instructing the first host to leave the maintenance mode.

2. The method of claim 1, wherein the method includes creating another replica of the process instance using the proxy on the first host subsequent to instructing the first host to leave the maintenance mode responsive to a determination that a third host is to be upgraded as part of the rolling upgrade.

3. The method of claim 1, wherein the method includes creating the replica of the process instance using the different proxy on the second host responsive to a determination that the second host is not executing another process instance of the cluster store.

4. The method of claim 1, wherein the method includes:
   determining that the second host is to be upgraded as a part of the rolling upgrade subsequent to instructing the first host to enter the maintenance mode, wherein the second host is executing another process instance of the cluster store;
   demoting the other process instance to another proxy;

creating another replica of the process instance using the proxy on the host;
instructing the second host to enter the maintenance mode;
upgrading the second host; and
instructing the second host to leave the maintenance mode.

5. The method of claim 1, wherein the method includes tracking the different proxy to determine whether the different proxy is capable of being used to create the replica.

6. The method of claim 1, wherein the method includes maintaining a fault tolerance threshold associated with the cluster.

7. The method of claim 1, wherein the first host entering maintenance mode includes stopping or migrating all processes running on the first host.

8. The method of claim 1, wherein the maintenance mode is a partial maintenance mode, and wherein entering the partial maintenance mode includes stopping or migrating a particular subset of processes running on the first host.

9. The method of claim 8, wherein the method includes determining that the process instance is not included in the particular subset of processes running on the first host that is to be stopped or migrated according to the partial maintenance mode.

10. The method of claim 9, wherein the method includes determining that the process instance has a dependency on a process included in the particular subset of processes running on the first host that is to be stopped or migrated according to the partial maintenance mode.

11. The method of claim 10, wherein the method includes:
demoting the process instance to the proxy;
creating the replica of the process instance using the different proxy on the second host of the cluster;
instructing the first host to enter the partial maintenance mode;
upgrading the first host; and
instructing the first host to leave the partial maintenance mode.

12. A non-transitory machine-readable medium having instructions stored thereon which, when executed by a processor, cause the processor to:
determine that a first host of a cluster of a software-defined datacenter (SDDC) is to be upgraded as a part of a rolling upgrade of the hosts of the cluster, wherein the first host is executing a process instance of a cluster store;
demote the process instance to a proxy;
responsive to a determination that a different proxy on a second host of the cluster is capable of being used to create a replica of the process instance:
create the replica of the process instance using the different proxy on the second host;
instruct the first host to enter a maintenance mode;
upgrade the first host; and
instruct the first host to leave the maintenance mode; and
responsive to a determination that there is not a proxy in the cluster that is capable of being used to create the replica of the process instance:
instruct the first host to enter the maintenance mode;
upgrade the first host; and
instruct the first host to leave the maintenance mode.

13. The medium of claim 12, including instructions to decrement a fault tolerance threshold associated with the cluster responsive to the determination that there is not the proxy in the cluster that is capable of being used to create the replica of the process instance.

14. The medium of claim 12, including instructions to, responsive to the determination that there is not the proxy in the cluster that is capable of being used to create the replica of the process instance:
instruct the first host to leave the maintenance mode and instantiate another replica.

15. The medium of claim 14, including instructions to increment the fault tolerance threshold associated with the cluster responsive to a determination that the other replica is being executed.

16. The medium of claim 12, wherein the determination that there is not a proxy in the cluster that is capable of being used to create the replica of the process instance includes a determination of a lack of proxy on the second host.

17. The medium of claim 12, wherein the determination that there is not a proxy in the cluster that is capable of being used to create the replica of the process instance includes a determination that the cluster includes only one host.

18. The medium of claim 12, including instructions to instruct a plurality of hosts to enter the maintenance mode simultaneously.

19. A system, comprising:
an upgrade engine configured to determine that a first host of a cluster of a software-defined datacenter (SDDC) is to be upgraded as a part of a rolling upgrade of the hosts of the cluster, wherein the first host is executing a process instance of a cluster store;
a demotion engine configured to demote the process instance to a proxy;
a proxy available engine configured to, responsive to a determination that a different proxy on a second host of the cluster is capable of being used to create a replica of the process instance:
create the replica of the process instance using the different proxy on the second host;
instruct the first host to enter a maintenance mode;
upgrade the first host; and
instruct the first host to leave the maintenance mode;
a proxy unavailable engine configured to, responsive to a determination that there is not a proxy in the cluster that is capable of being used to create the replica of the process instance:
decrement a fault tolerance threshold associated with the cluster;
instruct the first host to enter the maintenance mode;
upgrade the first host;
instruct the first host to leave the maintenance mode and instantiate another replica; and
increment the fault tolerance threshold associated with the cluster responsive to a determination that the other replica is being executed.

20. The system of claim 19, wherein the second host is not in maintenance mode when the replica of the process instance is created using the different proxy on the second host.

* * * * *